United States Patent [19]

Cutright

[11] Patent Number: 4,888,230

[45] Date of Patent: Dec. 19, 1989

[54] ONE-FIRE UNDERGLAZE DECAL SYSTEM

[75] Inventor: James W. Cutright, Columbiana, Ohio

[73] Assignee: The Homer Laughlin China Company, Newell, W. Va.

[21] Appl. No.: 245,768

[22] Filed: Sep. 16, 1988

[51] Int. Cl.[4] .................................................. B32B 3/00

[52] U.S. Cl. .................................... 428/195; 428/206; 428/207; 428/537.5; 428/913; 428/914; 156/60; 156/89; 156/230; 156/235; 156/240; 156/249

[58] Field of Search ............ 428/195, 206, 207, 537.5, 428/913, 914; 156/235, 240, 230, 249, 89, 60; 427/146, 147, 148, 378.2

[56] References Cited

U.S. PATENT DOCUMENTS

| | | | |
|---|---|---|---|
| 2,311,876 | 2/1943 | Scheetz, Jr. . | |
| 2,465,927 | 3/1949 | Rapp | 156/235 |
| 3,554,834 | 1/1971 | Bennett et al. | 256/235 |
| 3,565,713 | 2/1971 | Van Wagner | 156/27/10 |
| 3,860,471 | 1/1975 | Blanco et al. | 156/33/34 |
| 4,597,815 | 7/1986 | Nakamura | 156/235 |

*Primary Examiner*—Henry F. Epstein
*Assistant Examiner*—P. J. Ryan
*Attorney, Agent, or Firm*—Webb, Burden, Ziesenheim & Webb

[57] ABSTRACT

A decalcomania having a non-wood derived paper backing and a method for incorporating the decalcomania design onto a ceramic substrate. The paper backing can be derived from seaweed. The decalcomania can be applied to greenware without removal of the paper backing. The method requires no heat treating or firing of the ceramic article prior to setting the decalcomania and requires only on firing step following setting of the decalcomania to accomplish glazing.

17 Claims, No Drawings

ONE-FIRE UNDERGLAZE DECAL SYSTEM

BACKGROUND OF THE INVENTION

This invention relates to a novel decalcomania and to a method for incorporating the decalcomania design onto a ceramic article. The decalcomania has a novel paper backing and can be applied directly to unfired greenware without removal of the paper backing. The method requires no heat treating or firing of the ceramic article prior to fixation of the decalcomania and requires only one firing step following fixation of the decalcomania.

In the transfer of a decoration from a decalcomania to a ceramic material, it has been general practice to prefire the ceramic material to form a bisque and then to apply the decalcomania to the bisque. It has been customary to either remove the paper backing from the decalcomania upon setting the decalcomania onto the earthenware or to apply the decalcomania together with its paper backing and then to fire the article containing the decalcomania to burn away the backing before adding the glaze. Glazing occurs by spraying or dipping a glazing material followed by a firing step. Therefore, when the paper backing was not preremoved, it was customary for the ware to undergo two firing steps before spraying the glaze onto the decalcomania. The first firing step was the preparation of the bisque and the second was the burning of the paper backing.

According to the prior art, in the application of a decoration, pattern or logo to a ceramic or pottery article, there are several methods and types of decals that are commonly used to obtain the desired end product Prior art decals generally have a paper backing, a layer containing ceramic pigment powders in an organic base, and a top layer that is also organic which can also contain small amounts of ceramic fluxes. One prior art method of decal application is performed by first moistening the decal in water to enable removal of the paper backing, in which case the decalcomania used is commonly referred to as a water mount or slide-off decalcomania. Another prior art method of decal application is performed by moistening the decal in a solvent to enable removal of the paper backing, in which case the decalcomania used is referred to as a solvent mount decal. When the paper backing is removed from a prior art decalcomania, the organic base containing the ceramic pigment powders and the top organic layer remain intact so that the image, decoration, or pattern can then be transferred to the ceramic article and bonded to the surface by a method commonly referred to as "squeegeeing". The organic layers of the prior art decal do not allow proper glazing to occur unless they are first fired at a temperature sufficiently high to volatilize and drive off the organic layers and fuse the ceramic powders to the article. This procedure is called "hardening-on" and is time-consuming, costly and labor intensive and, thus, increases costs for each article decorated.

U.S. Pat. No. 3,860,471 outlines the following criteria which must be met in order to have a satisfactory decal system in a manufacturing atmosphere.

1. The decal must have sufficient body to stay in place on the ware, particularly when being applied to curved or irregular shaped surfaces.

2. The decal should flow smoothly when applied to the ware, e.g., by squeegeeing.

3. The decal should have good covering properties and leave no uncovered areas.

4. The bonding medium underneath the decal should not bond so quickly that the position of the decal cannot be adjusted on the clayware article.

5. The bonding medium must have sufficient bonding action to seal the decal to irregular or curved surfaces.

6. The bonding medium must insure adhesion of the decal during glazing and firing.

7. The bonding medium is preferably water soluble or water miscible so as to permit cleaning of work areas without the use of organic solvents.

8. The decal should allow the application of glaze over its surface to be equal in thickness to all other areas on the article being glazed where there is no decal present.

SUMMARY OF THE INVENTION

In accordance with the present invention, a novel decalcomania is provided which can be applied to a ceramic material without removing the paper backing and without any firing of the ceramic before spraying a glazing material. Therefore, the decalcomania can be applied to greenware which has not been prefired to form a bisque. In accordance with this invention, there is no requirement for a firing step until both the decalcomania and the glaze have been applied, and the firing step to accomplish glazing is the only firing step required in the procedure.

The present invention employs a novel paper backing for the decalcomania. Previously, it has been customary to employ a paper backing derived from wood fiber. In contrast, the paper backing of the decalcomania of this invention is a non-wood derived paper. A suitable paper backing can be made of seaweed. Such a paper can be made as a thin film. The novel paper gasifies very rapidly upon heating so that even though firing occurs after application of the glaze, the paper gasifies sufficiently rapidly for it to be decomposed and removed from the system before unsightly carbon combustion products can be entrapped in the glaze.

DETAILED DESCRIPTION OF THE INVENTION

The decal of this invention employs a non-wood derived paper to which is applied an organic base containing inorganic pigments and fluxes. As stated, a suitable non-wood derived paper is a paper derived from seaweed. A wood fiber paper cannot hold the decal down during the glazing step. However, the non-wood base paper of this invention is prepared as a thin and porous film and can be bonded to the clayware by the use of a bonding medium so that the decal is not disturbed during glazing. The non-wood paper is prepared to be sufficiently porous to permit proper glazing of the article with the paper present and yet be sufficiently strong and rigid to hold the decal in place on the clayware article through drying, firing and glazing steps.

A wood base paper backing for a decalcomania which is not removed prior to a glazing step will tend to carbonize and discolor and reject the glaze during conventional glazing of a bisque substrate. However, when a non-wood base paper is applied to a clay, ceramic or pottery greenware substrate having a bonding agent where the substrate has not be prefired, and the subsequent firing step is performed sufficiently slowly to allow conversion of the carbonaceous material of the paper to carbon oxide gases which are allowed time to escape, discolorization will not occur and the firing will produce a clear, glass-like finish. Generally, a firing temperature of about 2000° F., or higher, is required to both mature the glaze on the greenware and form a bisque., but the non-wood base paper of this invention should be decomposed and gasified at a temperature below 1900° F. and this can occur while the greenware is being heated to the firing temperature.

In accordance with the decal making process of this invention, the non-wood decal paper can be used in the same manner as a wood-derived decal paper. The decoration can be applied to the paper by the silkscreening method. The organic layer that is applied to the paper by the silkscreening procedure contains the ceramic pigments and fluxes that produce the desired color effects on the final fired product. This organic layer has properties similar to the properties of the bonding medium, and the organic layer and the bonding medium have access to each other through pores in the paper to form a common medium whereby the bonding medium and the organic layer work together in a similar manner during decal application and glazing.

Only one organic layer on the paper is required to produce the decal of this invention. No additional top layer is required, as is necessary in decals of the prior art. After the organic layer s dried on the paper for a short period, i.e., about 15 minutes, or more, decals so produced can be placed in stacks ready for the application process.

The procedure for applying the decal is simple. First, the decal can be cut in a contoured outline around the decoration before application. Secondly, the bonding medium is applied by brush or spray to the area on the article where the decal is !o be positioned. Thirdly, the decal is laid on the area and then squeegeed down smoothly over the article. The decal does not need to be moistened with water or a solvent before application.

Finally, the freshly decorated article is dried for about one hour, or more, at or near room temperature before it is glazed and fired. The drying step can occur at room temperature, or slightly above room temperature, but well below firing temperature. The glazing and firing step occurs by heating to a temperature of about 2000° F., or higher. The non-wood base paper of this invention is sufficiently porous so that even though the paper is not removed when setting the decal in place, the organic solvent contained in the bonding agent can pass through the paper and escape during the drying step and prior to the firing step without disrupting the design. The flow-through characteristic of the paper is necessary to the quality of the final product. Furthermore, the nature of the paper permits the color pigments in the decal to join with the bonding material during the high temperature firing step during or following the decomposition of the paper.

The bonding medium and the organic layer must work in conjunction. Both the bonding medium and the decal organic layer formulations have components that can be grouped into two general categories, the first category being finely ground inorganic powders including pigments and fluxes, and the second category is the organic liquid vehicle used to carry, in suspension, the materials in the first category. The fluxes promote vitrification. Standard fluxes can be employed such as finely pulverized glass, feldspar, hepheline syenite, etc. Water can be blended into the system, but is not required. The liquid vehicle must possess certain properties so that when it is combined with the inorganic pigments and/or fluxes, the composition satisfies the necessary criteria for a decal as stated above.

It is customary for the organic layer on the decal paper to comprise materials from both the first and the second categories. The materials in the first category can be present in various proportions based upon the desired final color and visual surface appearance.

The bonding medium can contain materials from both categories also, but normally the bonding medium will include fluxes and omit inorganic pigments. Fluxes are required in the bonding medium to guarantee proper vitrification of the inorganic pigment layer to the clayware surface during firing.

As stated earlier, it is preferred that the bonding medium and organic layer be water soluble or miscible. Therefore, the liquid vehicle used for both formulations will usually be derived from water soluble or miscible synthetic resins. Single chemical compounds can be utilized individually or compounded into more complex formulations to serve as the vehicle.

Two of the most suitable groups of synthetic resins that can be utilized are alkyd resins and lacquer resins. Some of the chemical compounds specifically from the alkyd group are ethylene glycol, methylene glycol, propylene glycol and glycerol. Chemical compounds from the lacquer group are nitro cellulose, cellulose acetate, cellulose ethers such as ethyl cellulose, carboxymethyl cellulose, sodium, carboxymethyl cellulose, styrene polymers, and vinyl and acrylic copolymers.

Many individual compounds from one or both of these groups can provide the necessary properties needed for the bonding medium and the organic layer to interact properly throughout the entire process. The most suitable compounds for the liquid vehicle are those containing varying proportions of glycerol and an acrylic polymer, such as product 65-154, produced by the Johnson-Mathey Company.

I claim:

1. A decalcomania for mounting on a ceramic substrate comprising inorganic powders suspended in an organic vehicle on a non-wood derived paper backing, said paper of a type which decomposes and gasifies at temperatures below a curing and bisque forming temperature of the ceramic substrate.

2. The decalcomania of claim 1 wherein said paper is derived from seaweed.

3. The decalcomania of claim 1 wherein said inorganic powders comprise flux and pigments.

4. The decalcomania of claim 1 wherein said inorganic powders suspended in an organic vehicle comprise the only layer on said paper backing.

5. The decalcomania of claim 1 wherein said organic vehicle comprises water soluble or water miscible synthetic resin.

6. The decalcomania of claim 1 wherein said organic vehicle comprises alkyd resin or lacquer resin.

7. The decalcomania of claim 1 wherein said organic vehicle comprises glycerol and acrylic polymer.

8. The decalcomania of claim 1 wherein said organic vehicle is selected from the group consisting of ethylene glycol, methylene glycol, propylene glycol and glycerol.

9. The decalcomania of claim 1 wherein said organic vehicle is selected from the group consisting of nitro cellulose, cellulose acetate, ethyl cellulose, carboxymethyl cellulose, sodium carboxymethyl cellulose, styrene polymer and vinyl and acrylic copolymers.

10. A decalcomania for mounting on a ceramic substrate comprising inorganic pigment and flux suspended in an organic vehicle on a non-wood derived paper backing, said paper of a type which decomposes and gasifies at temperatures below a curing and bisque forming temperature of the ceramic substrate, said suspension being the only layer on said paper backing.

11. A decalcomania for mounting on a ceramic substrate comprising inorganic pigment and flux suspended in a mixture of glycerol and acrylic polymer on a non-wood derived paper backing, said paper of a type which decomposes and gasifies at temperatures below a curing and bisque forming temperature of the ceramic substrate.

12. The decalcomania of claim 11 wherein said paper backing is derived from seaweed.

13. A method for applying a design to non-fired ceramic greenware comprising applying a bonding medium to said greenware, setting a non-wood derived paper-backed decalcomania on said bonding medium without removing said paper backing, applying a glaze over said decalcomania and firing said greenware at a temperature sufficient to both mature the glaze and form a bisque and wherein said non-wood derived paper is of a type which decomposes and gasifies at temperatures below said firing temperature.

14. The method of claim 13 wherein said paper is derived from seaweed.

15. The method of claim 13 including drying said decalcomania at or near room temperature before applying said glaze.

16. The method of claim 13 wherein said firing step is the only firing step to which said greenware is subjected.

17. A method for applying a design to non-fired ceramic greenware comprising applying to said greenware a bonding medium comprising flux suspended in a bonding organic vehicle, setting on said bonding medium, a decalcomania comprising decalcomania flux and pigment suspended in a decalcomania organic vehicle and supported on a non-wood derived paper backing, said paper backing being porous and migration of bonding organic vehicle occurring through said pores, drying said decalcomania near room temperature, applying a glaze over said decalcomania and firing said greenware at a temperature sufficient to both mature the glaze and form a bisque, said paper being of a type which decomposes and gasifies at a temperature below said firing temperature.

* * * * *

UNITED STATES PATENT AND TRADEMARK OFFICE

CERTIFICATE OF CORRECTION

PATENT NO. : 4,888,230

DATED : December 19, 1989

INVENTOR(S) : James W. Cutright

It is certified that error appears in the above-identified patent and that said Letters Patent is hereby corrected as shown below:

Column 1 Lines 35-36 after "product" insert --.--.

Column 3 Line 28 "s" should read --is--.

Column 3 Line 36 "!o" should read --to--.

Claim 17 Line 12 Column 6 after "comprising" insert --bonding--.

Signed and Sealed this

Nineteenth Day of March, 1991

*Attest:*

HARRY F. MANBECK, JR.

*Attesting Officer*

*Commissioner of Patents and Trademarks*